United States Patent
Gautama (10) Patent No.: US 10,964,332 B2
(45) Date of Patent: Mar. 30, 2021

(54) AUDIO COMMUNICATION METHOD AND APPARATUS FOR WATERMARKING AN AUDIO SIGNAL WITH SPATIAL INFORMATION

(71) Applicant: NXP B.V., Eindhoven (NL)

(72) Inventor: Temujin Gautama, Boutersem (BE)

(73) Assignee: NXP B.V., Eindhoven (NL)

( * ) Notice: Subject to any disclaimer, the term of this patent is extended or adjusted under 35 U.S.C. 154(b) by 167 days.

(21) Appl. No.: 15/710,658

(22) Filed: Sep. 20, 2017

(65) Prior Publication Data

US 2018/0096693 A1    Apr. 5, 2018

(30) Foreign Application Priority Data

Sep. 30, 2016 (EP) ..................... 16191986

(51) Int. Cl.
| | |
|---|---|
| *G10L 19/018* | (2013.01) |
| *H04L 12/18* | (2006.01) |
| *G10L 19/008* | (2013.01) |
| *H04M 3/56* | (2006.01) |
| *G10L 19/16* | (2013.01) |

(52) U.S. Cl.
CPC .......... *G10L 19/018* (2013.01); *G10L 19/008* (2013.01); *H04L 12/1822* (2013.01); *H04M 3/568* (2013.01); *G10L 19/167* (2013.01); *H04S 2420/01* (2013.01); *H04S 2420/03* (2013.01)

(58) Field of Classification Search
CPC .............................. G10L 19/018; G10L 19/008
USPC ........................................................ 704/500
See application file for complete search history.

(56) References Cited

U.S. PATENT DOCUMENTS

| | | | |
|---|---|---|---|
| 7,369,633 B2* | 5/2008 | Jiang ....................... | H04L 7/048 370/503 |
| 8,094,834 B1* | 1/2012 | Brungart ................. | H04S 7/304 381/92 |
| 9,774,976 B1* | 9/2017 | Baumgarte ............. | H04S 7/302 |

(Continued)

FOREIGN PATENT DOCUMENTS

| | | |
|---|---|---|
| EP | 2285025 A1 | 2/2011 |
| WO | WO-2015/028715 A1 | 3/2015 |

OTHER PUBLICATIONS

Breebaart J. et al; "High-quality Parametic Spatial Audio Coding at Low Birates"; Audio Engineering Society Convention paper 6072 Berlin, DE; 13 pages (May 2004).

(Continued)

*Primary Examiner* — Shaun Roberts (57) ABSTRACT

An apparatus and method for speech communication is described. An audio transmit processor captures at least two audio signals from an audio source, and processes the at least two audio signals to provide a mono audio signal and a non-audio signal comprising spatial information representative of the direction of the audio source. The audio transmit processor combines the non-audio signal with the mono audio signal by watermarking; and transmits the watermarked audio signal. An audio receive processor receives a watermarked audio signal and extracts a mono audio signal and a non-audio signal comprising spatial information from the watermarked audio signal. The audio receive processor processes the mono audio signal and spatial information to generate at least two output audio signals.

18 Claims, 3 Drawing Sheets

(56) References Cited

U.S. PATENT DOCUMENTS

| | | | |
|---|---|---|---|
| 2002/0154706 A1* | 10/2002 | Torres | H04L 27/001 375/295 |
| 2003/0035553 A1 | 2/2003 | Baumgarte et al. | |
| 2006/0233380 A1* | 10/2006 | Holzer | G10L 19/008 381/23 |
| 2007/0223740 A1* | 9/2007 | Reams | G10L 19/008 381/119 |
| 2009/0034704 A1 | 2/2009 | Ashbrook et al. | |
| 2009/0055196 A1 | 2/2009 | Oh et al. | |
| 2009/0063140 A1* | 3/2009 | Villemoes | G10L 19/0204 704/211 |
| 2009/0138271 A1* | 5/2009 | Christensen | G10L 19/0208 704/500 |
| 2011/0033061 A1* | 2/2011 | Sakurada | G10H 3/186 381/81 |
| 2012/0039477 A1* | 2/2012 | Schijers | G10L 19/008 381/22 |
| 2012/0224702 A1* | 9/2012 | Den Brinker | G10L 19/008 381/22 |
| 2012/0317022 A1* | 12/2012 | Levy | H04N 1/32144 705/39 |
| 2013/0051560 A1* | 2/2013 | Ray | H04S 3/002 381/2 |
| 2014/0101174 A1* | 4/2014 | Tsai | G06F 7/24 707/752 |
| 2015/0016661 A1 | 1/2015 | Lord | |
| 2018/0035174 A1* | 2/2018 | Littlejohn | H04N 21/8358 |

OTHER PUBLICATIONS

Gruhl, Daniel et al; "Echo Hiding"; Proceedings of the First International Workshop on Information Hiding LNCS; vol. 1174 pp. 295-315 (1996).

Nishimura, Akira; "Data Hiding for Audio Signals that are Robust with Respect to Air Transmission and a Speech Codec"; International Conference on Intelligent Information Hiding and Multimedia Signal Processing; 4 pages (2008).

* cited by examiner

AUDIO COMMUNICATION METHOD AND APPARATUS FOR WATERMARKING AN AUDIO SIGNAL WITH SPATIAL INFORMATION

CROSS-REFERENCE TO RELATED APPLICATIONS

This application claims the priority under 35 U.S.C. § 119 of European patent application no. 16191986.5, filed Sep. 30, 2016 the contents of which are incorporated by reference herein.

FIELD

This disclosure relates to an apparatus and method for audio communication over a network.

BACKGROUND

Voice communication is often still carried over a telecommunications network by mono audio signals. For example networks such as those supporting GSM, CDMA communication channels are designed for mono audio signals. At the transmitter end, the audio signal may be captured using one or more microphones and processed to generate a mono audio signal. The mono audio signal is sent to the audio encoder for data compression by a speech codec before being sent over the network. At the receiver end, the received data are decoded by a speech codec which outputs the received mono audio signal. The mono audio signal is then sent to one or more loudspeakers, depending on the playback capabilities of the receiver device and the use case. The encoding and decoding are often specific speech codecs, for example GSM full-rate and enhanced-full-rate, which use speech-specific parameter estimation methods to obtain a compact bit-stream.

SUMMARY

Various aspects of the disclosure are defined in the accompanying claims.

In a first aspect there is described an audio transmit processor for a transmitter device configured for communication over a network, the audio transmit processor comprising: an audio capture module configured to receive at least two audio signals from an audio source and to generate a mono audio signal and a non-audio signal from the at least two audio signals, the non-audio signal comprising at least one of parametric stereo information and spatial information of the audio source; an audio watermarking module coupled to the audio capture module and configured to embed the non-audio signal in the mono audio signal and to output a watermarked audio signal.

In one or more embodiments the spatial information is representative of one or more of the direction and the position of the audio source.

In one or more embodiments, the audio transmit processor may further comprise an audio encoding module coupled to the audio watermarking module and configured to encode the watermarked audio signal for transmission.

In one or more embodiments, the spatial information may comprise at least one of a time-difference-of-arrival and an intensity difference between the at least two audio signals.

In one or more embodiments, the parametric stereo data comprises at least one of a phase difference between the at least two audio signals per frequency band, a level difference between the at least two audio signals per frequency band, and the coherence between the at least two signals per frequency band.

In one or more embodiments, the non-audio signal further comprises data representative of at least one of the number of audio signals captured, the transmitter type, the GPS coordinates, and the caller identity.

In one or more embodiments, each of the at least two audio signals are received from a respective microphone.

In a second aspect there is described an audio receive processor for a receiver device configured for voice communication over a communications network, the audio receive processor comprising: an audio watermark extraction module configured to extract data from a non-audio signal embedded in a received mono audio signal, the non-audio signal comprising at least one of parametric stereo information and spatial information of an audio source and an audio playback module coupled to the audio watermark extraction module and configured to process the mono signal and the at least one of parametric stereo information and spatial information and to provide at least two output audio signals for output via a respective loudspeaker.

In one or more embodiments, the spatial information is representative of the direction or spatial position of an audio source captured by a transmitter.

In one or more embodiments, the audio receive processor may comprise an audio decoding module coupled to the audio watermark extraction module and the audio playback module and configured to decode a received signal and output a watermarked mono audio signal to the audio watermark extraction module.

In one or more embodiments, the audio playback module may be further configured to apply upmixing to the mono audio signal in dependence of the spatial information.

In one or more embodiments, an audio processor may comprising an audio transmit processor and an audio receive processor.

In a further aspect there is described a method for transmitting audio over a communications network, the method comprising: capturing at least two audio signals from an audio source; processing the at least two audio signals to provide a mono audio signal and a non-audio signal comprising at least one of parametric stereo information and spatial information of the audio source; combining the non-audio signal with the mono audio signal by watermarking; outputting the watermarked audio signal.

In a further aspect there is described a method for receiving audio over a communications network comprising: receiving a watermarked audio signal; extracting a mono audio signal and a non-audio signal comprising spatial information from the watermarked audio signal, the non-audio signal comprising at least one of parametric stereo information and spatial information of the audio source; processing the mono audio signal and spatial information to generate at least two output audio signals.

In a further aspect there is defined a computer program product comprising instructions which, when being executed by a processing unit, cause said processing unit to perform the steps of capturing at least two audio signals from an audio source; processing the at least two audio signals to provide a mono audio signal and a non-audio signal comprising at least one of parametric stereo information and spatial information of the audio source; combining the non-audio signal with the mono audio signal by watermarking; outputting the watermarked audio signal.

In a further aspect there is defined a computer program product comprising instructions which, when being executed by a processing unit, cause said processing unit to perform the steps of receiving a watermarked audio signal; extracting a mono audio signal and a non-audio signal comprising spatial information from the watermarked audio signal, the non-audio signal comprising at least one of parametric stereo information and spatial information of the audio source; processing the mono audio signal and spatial information to generate at least two output audio signals.

BRIEF DESCRIPTION OF DRAWINGS

In the figures and description like reference numerals refer to like features.

Embodiments of the invention are now described in detail, by way of example only, illustrated by the accompanying drawings in which.

DESCRIPTION

Figure 1:
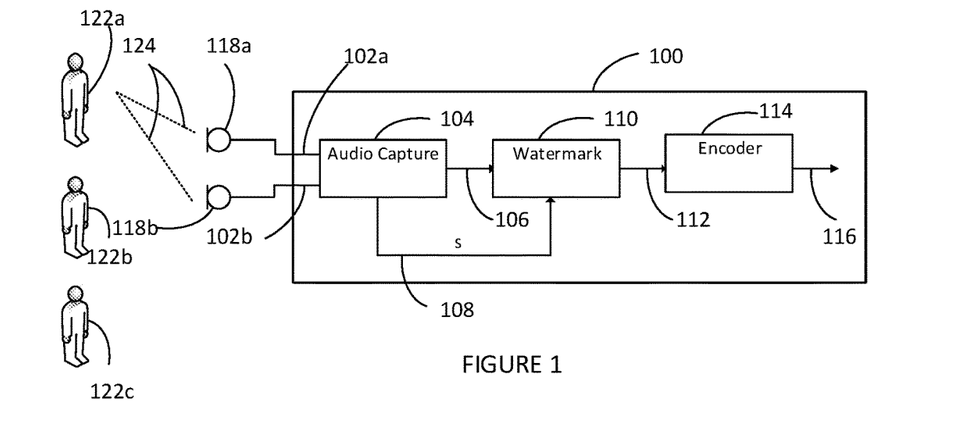
FIG. 1 shows an audio transmit processor for voice communication over a network according to an embodiment.

FIG. 1 shows an audio transmit processor 100 for voice communication over a network. Audio capture module 104 may have a first microphone input 102a and a second microphone input 102b. An audio signal output 106 of the audio capture module 104 may be connected to a first input of an audio watermark module 110. A data output 108 of the audio capture module 104 may be connected to a second input of the audio watermark module 110. An output 112 of the audio watermark module 110 may be connected to an input of an audio encoder 114. Audio encoder 114 may have an audio encoder output 116.

In operation, the audio capture module 104 may receive a first audio signal detected via a first microphone 118a connected to the first microphone input 102a and a second audio signal detected via a second microphone 118b connected to the second microphone input 102b. The first audio signal and second audio signal may include a desired audio signal component from an audio source, for example the speech of one or more users 122a, 122b, 122c of the audio transmit processor 100. As illustrated, the speech from a user 122a represented by the dashed lines 124 together with background noise components is shown. The audio capture module 104 may process the first and second audio signals for example by applying typical beamforming, noise suppression, acoustic echo cancellation and/or speech enhancement processing. The audio capture module 104 may generate spatial information from the first and second audio signals, for example differences in time-difference-of-arrival, amplitude and intensity, which may be used to derive the direction or position of the captured audio source 122.

In some examples the audio capture module 104 may characterise information from the first and second audio signals, using techniques such as those used in parametric stereo coding. Parametric stereo coding techniques divide the stereo audio signal into frequency bands, and compute spatial parameters for each frequency band, such as for example the interchannel intensity difference, the interchannel phase difference and the interchannel coherence between each frequency band. These spatial parameters characterise the stereo information present in the stereo audio signal.

The audio capture module 104 may output the spatial information on the data output 108. In some examples, the audio capture module 104 may also output a value of the number of audio signals detected on the data output 108 corresponding to the number of microphones used to detect the audio source.

The audio watermark module 110 may receive the mono audio signal and the spatial information from the audio capture module 104. The spatial information may represent the desired spatial position or direction from which the audio should be perceived to originate during playback relative to the loudspeaker positions. The audio watermark module 110 embeds the spatial information into the mono audio signal. In some examples, the audio watermark module 110 may embed the spatial information in such a way that it does not introduce audible artefacts and that it is robust to the encoding and decoding operations from the speech codec that follow.

The inventor of the present disclosure has appreciated that watermarking which is used traditionally for content protection by embedding copyright information into music or other pre-recorded audio or other data and information about the music track may also be used to embed spatial information together with a mono audio signal. Watermarking may preserve the watermark information even after processing by a speech codec. In a typical watermarking technique, the signal is filtered by a filter-bank, after which sinusoidal amplitude modulations (SAM) are applied to neighbouring sub-band signals in the opposite phase. These sinusoidal amplitude modulations are used as the carrier of the embedded information: the embedded information is encoded by Phase Shift Keying, defined as the phase differences between SAMs applied to the base group and the other groups which are classified on the basis of a key. Such a watermarking technique may retain information in a signal which is then subsequently encoded for transmission for example by a speech encoder It will be appreciated that other non-audio information can be embedded in addition to the spatial information such as information about the type of transmitter device, the number of microphones, or in conventional phone calls, the identity and/or the Global Positioning System (GPS) coordinates of the caller.

The audio watermark module 110 may then output the mono audio signal together with the embedded spatial information to an encoder 114, for example a speech encoder. The encoder 114 may be part of a speech codec. The output of the encoder 114 may be connected to a transmission circuit (not shown) for transmission over a communications network such as a telephone network, mobile phone network or computer network. In some examples, additional encoding prior to transmission may not be required in which case the encoder 114 may be omitted.

The audio capture module 104 may be implemented by hardware or software running on a microprocessor or digital signal processor with a separate analog to digital converter for interfacing to a microphone input. The audio watermark module 110 may be implemented as a digital circuit or by software running on a digital signal processor or other microprocessor. The audio transmit processor 100 has two microphone inputs to capture an audio source. In other examples, the audio transmit processor may have more than two microphone inputs which, when connected to a respective microphone, may improve the accuracy of the spatial information. The audio transmit processor may be incorporated into an audio processor which provides additional audio signal processing for example noise suppression, acoustic echo cancellation, speech enhancement filtering and/or equalization for an audio signal.

Figure 2:
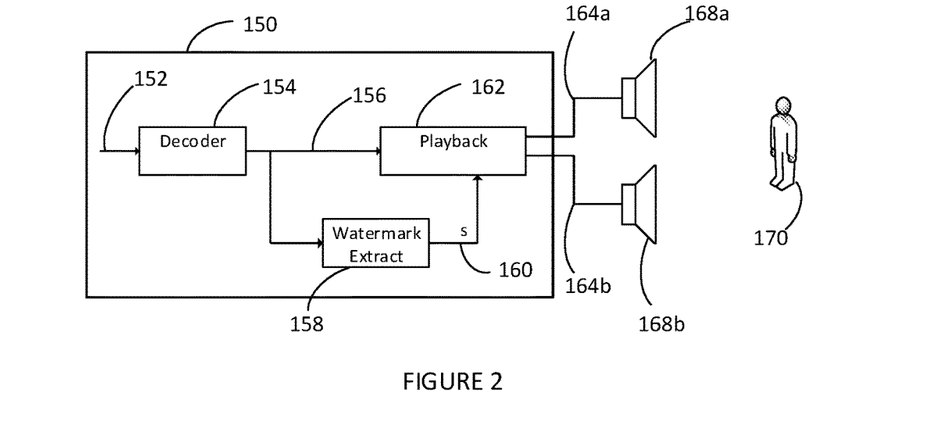
FIG. 2 illustrates an audio receive processor for voice communication over a network according to an embodiment.

FIG. 2 shows an audio receive processor 150 for voice communication over a network. A decoder 154 may have an input for receiving a speech encoded signal 152. An output 156 of the decoder 154 may be connected to a playback module 162 and a watermark extraction module 158. An output of the watermark extraction module 160 may be connected to the playback module 162. The playback module 162 may have a first audio output 164a and a second audio output 164b.

In operation, the audio receive processor 150 may receive a transmitted watermarked audio signal via a receiver interface circuit (not shown). The receiver interface circuit may provide the watermarked audio signal data to the decoder on the decoder input 152. The decoder 154, which may be included in a speech codec, decodes the data which may include a mono audio signal together with a non-audio signal including embedded spatial information.

The watermark extraction module 158 may extract any spatial information included in the non-audio signal and provide the spatial information to the playback module 162. The watermark extraction module function may depend on which watermarking techniques was used. In one example to extract the spatial information that is included in the watermarked audio signal, the audio signal may be filtered by a filter-bank. The sinusoidal amplitude modulation (SAM) is extracted on the basis of the ratio of the amplitude envelopes from neighbouring sub-band signals. Using the pre-defined key used during the watermarking, the SAMs of the base group are compared to those of the others, and this PSK-encoded data can be decoded into a bit stream. In other examples different watermark extraction methods may be used.

The audio playback module 162 may also receive the mono audio signal directly from the decoder 154. The spatial information extracted from the watermarked audio signal is then used for processing the mono signal. For example, the audio playback module 162 may up-mix the mono signal to a stereo signal for example by copying and modifying the mono audio signal differently for the left and right channels in accordance with the spatial information. This channel up-mixing may be achieved by for example left/right panning the mono signal, by applying a different gain to left and right, or by using typical loudspeaker array beamforming techniques.

After up-mixing the audio signal, each channel is sent to the respective audio outputs 164a and 164b which are connected to respective loudspeakers 168a and 168b. The audio outputs 164a and 164b may be connected directly to loudspeakers or in some examples connected to further interface circuitry (not shown) such as a class-D audio amplifier which drives the loudspeakers.

The audio transmit processor 100 may be used by multiple users 122a, 122b and 122c for example when used in a system for conference calls. By using spatial information to render the mono audio signal, the position of the user speaking in the received signal will be perceived differently by the user 170 at the receiver side dependent on the relative position of the user speaking 122a to an audio transmit processor 100 when the signal was captured. If the audio receive processor 150 does not receive a watermarked audio signal, then the audio receive processor 150 will behave as a conventional receiver and process the mono audio signal without any spatial information. The audio receive processor 150 may play back the audio to 'position' the audio from different participants 122a, 122b, 122c at the transmitter side in different spatial locations at the receiver side using acoustic beamforming techniques. This may help the users listening to determine which user is speaking.

The audio receive processor 150 may be incorporated into an audio processor which provides additional audio signal processing for example noise suppression, speech enhancement, filtering or equalization for an audio signal. The decoder 154 may be implemented by hardware or software running on a microprocessor or digital signal processor. In some examples, an additional decoder may not be required before watermark extraction and audio processing by the audio receive processor 150, in which case the decoder 154 may be omitted.

The watermark extractor 158 may be implemented as a digital circuit or by software running on a digital signal processor or other microprocessor. The audio playback module 162 may be implemented as a digital circuit or by software running on a digital signal processor or other microprocessor. The audio receive processor 150 has two audio outputs 164a and 164b. In other examples, the audio receive processor may have more than two audio outputs.

Figure 3:
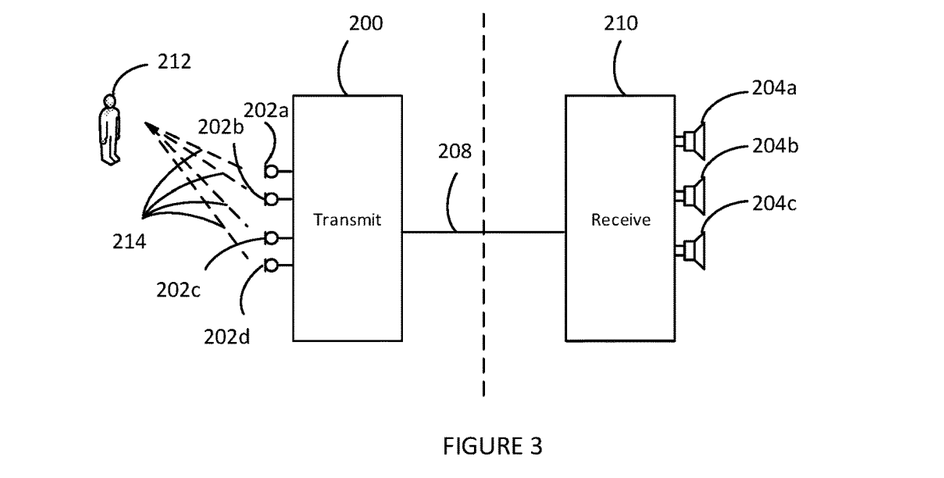
FIG. 3 illustrates a voice communication system including an audio transmit processor and an audio receive processor according to an embodiment.

FIG. 3 shows a communication system for transmitting speech over a network using an audio transmit processor 200 and an audio receive processor 210 connected via network 208. The audio transmit processor 200 is similar to the audio transmit processor 100 but has four microphone inputs which are operably connected to four microphones 202a-d. The audio receive processor 210 has four audio outputs operably connected to three loudspeakers 204a-c. In operation speech from a user 212 represented by the dashed lines 214 may be captured by the respective microphones 202a-d. The four captured audio signals may then be processed to provide a mono signal and spatial information. The mono signal may then be combined with embedded spatial information using watermarking before transmission over the communication network link 208. The audio receive processor 210 may receive the watermarked signal which is then processed to extract the spatial information together with the mono signal. The mono signal and the spatial information may then be used to render the audio signal differently for each of the loudspeakers 204a to 204c by for example copying the mono signal and then applying different gains and equalisation parameters to each of the signals depending on the spatial information using typical techniques such as beamforming.

As will be appreciated an equivalent audio transmit processor and audio receive processor may be used for speech transmission in the opposite direction to that illustrated in FIG. 2. The voice communication may be used by multiple users for example when used in a system for conference calls. By using spatial information to render the mono audio signal, the position of the speech in the received signal will be perceived differently by the user dependent on the relative position of the user 212 to the audio transmit processor 200 when the signal was captured. If the audio receive processor 210 does not receive a watermarked audio signal, then the audio receive processor 210 will behave as a conventional voice receiver. This may allow the audio transmit processor 200 and the audio receive processor 210 to be used in combination with conventional devices such as fixed or landline phones and mobile phones.

Figure 4:
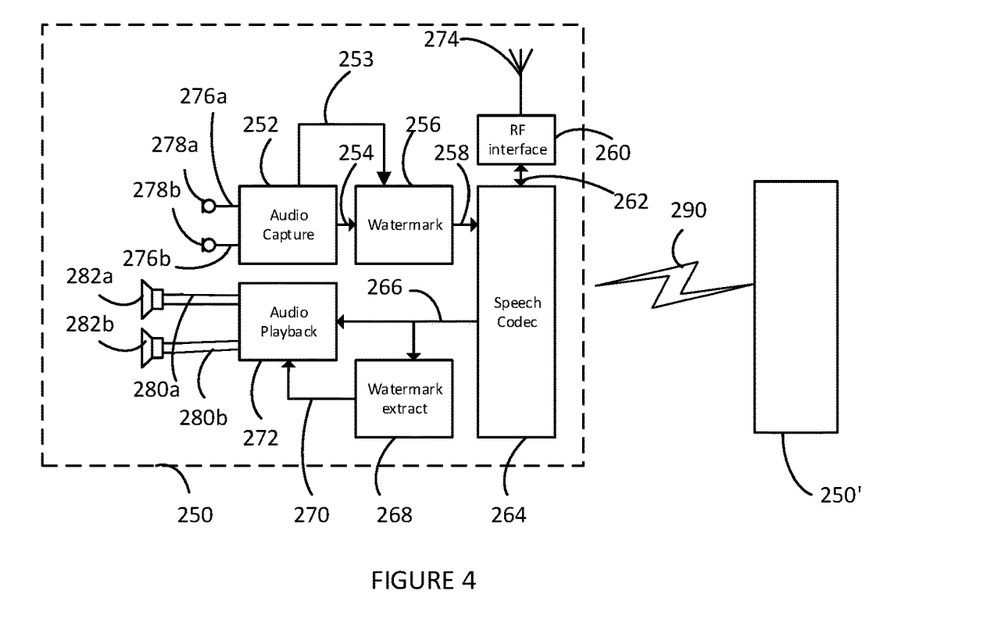
FIG. 4 shows a mobile phone according to an embodiment.

FIG. 4 shows a mobile phone 250 according to an embodiment. Mobile phone 250 has a first microphone 278a and a second microphone 278b. The first microphone 278a may be connected to a first microphone input 276a of an audio capture module 252. The second microphone 278b may be connected to a second microphone input 276b of the audio capture module 252. A first output 253 of the audio capture module 252 may be connected to an input of the watermark module 256. A second output 254 of the audio capture module 252 may be connected to an input of the watermark module 256. An output 258 of the watermark module 256 may be connected to a speech codec 264. An output 266 of the speech codec may be connected to an input of a watermark extraction module 268 and an input of audio playback module 272. An output 270 of the watermark extraction module 268 may be connected to the audio playback module 272. A first speaker output 280a of the audio playback module 272 may be connected to a first loudspeaker 282a. A second speaker output 280b of the audio playback module 272 may be connected to a second speaker 282b. The speech codec 264 may have a bidirectional connection 262 to a radio frequency (RF) interface 260. The RF interface 260 may be connected to an antenna 274.

The mobile phone 250 may for example be used in a hands-free operation mode for conference calls with two or more users. The audio capture module 252 may receive a first audio signal detected via a first microphone 278a and a second audio signal detected via a second microphone 278b. The first audio signal and second audio signal may include a desired audio signal component from an audio source, for example the speech of a user of the mobile phone 250 together with background noise components. The audio capture module 252 may process the first and second audio signals for example by applying typical echo cancellation and beamforming processing. The audio capture module 252 may generate spatial information from the first and second audio signals, for example differences in one or more of a time-difference-of-arrival, amplitude and intensity, which may be used to derive the direction or spatial position of the captured audio source.

The audio capture module 252 may output the spatial information on the first audio capture output 253. In some examples, the audio capture module 252 may also output the number of audio signals detected on the first audio capture output 253, corresponding to the number of microphones used. The audio capture module 252 may output the mono audio signal data on the second audio capture output 254.

The audio watermark module 256 receives the mono audio signal and the spatial information from the audio capture module 252. The spatial information may represent the desired spatial position or direction from where the audio source should be perceived to originate during playback relative to the loudspeaker positions. The audio watermark module 256 may embed the spatial information into the mono audio signal in such a way that it does not introduce audible artefacts and that it is robust to the encoding and decoding operations from the speech codec 264.

It will be appreciated that other non-audio information can be embedded as well, such as information about the type of transmitter device, the number of microphones, or in conventional phone calls, the identity and/or the GPS coordinates of the caller. This information may be displayed on a screen (not shown) or stored in memory (not shown).

The watermark module 256 may then output the mono audio signal together with the embedded spatial information to the speech codec 264. The speech codec 264 may output the encoded watermarked speech to the RF interface 260 for transmission via the mobile phone network 290. A similar mobile device 250' may receive the watermarked audio signal and extract the spatial information.

When receiving a signal via the wireless communication network 290, the mobile phone 250 may receive a transmitted watermarked audio signal via the antenna 274 and the RF interface 260. The RF interface 260 may provide the watermarked audio signal data to speech codec 264. The speech codec 264 may decode the data, which may include a mono audio signal with embedded spatial information. The watermark extraction module 268 may extract any spatial information included in the signal by watermarking and provide the spatial information to the playback module 272. The playback module 272 also receives the mono audio signal directly from the speech codec 264. The spatial information embedded in the watermarked audio signal is then used for processing the mono signal which may then be upmixed to a stereo signal for example by copying and modifying the mono audio signal differently for the left and right channels in accordance with the spatial information. This may be achieved by for example left/right panning the mono signal, by applying a different gain to left and right, or by using typical loudspeaker array beamforming techniques. After upmixing, the channels are sent to the respective audio outputs 280a and 280b which are connected to respective loudspeakers 282a and 282b.

By using spatial information to render the mono audio signal, the position of the speech in the received signal will be perceived differently by the one or more users dependent on the relative position of the user speaking or other audio source to a transmitter when the signal was captured. If the mobile phone 250 does not receive a watermarked audio signal, then the mobile phone 250 will behave as a conventional receiver. The mobile phone 250 may play back the audio to virtually position the audio from different participants at the transmitter side in different spatial locations at the receiver side using acoustic beamforming techniques. This may help the users listening to determine which user is speaking.

Figure 5:
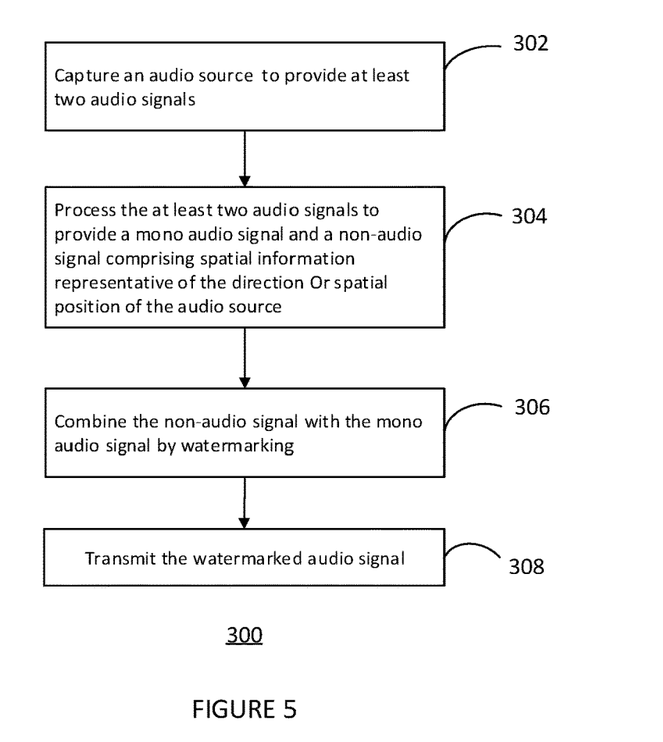
FIG. 5 shows a method of audio communication over a network according to an embodiment.

FIG. 5 shows a method of transmitting an audio signal over a communications network 300. In step 302, an audio source may be captured to provide at least two audio signals. The audio signals may be captured by two or more microphones. In step 304, the at least two audio signals may be processed to provide a mono audio signal, and a non-audio signal which comprises spatial information representative of the direction or the spatial position of the audio source. In step 306, the non-audio signal may be combined with the mono audio signal by watermarking, resulting in a watermarked mono audio signal with embedded spatial information. In step 308 the watermarked audio signal may be transmitted over a communications network.

Figure 6:
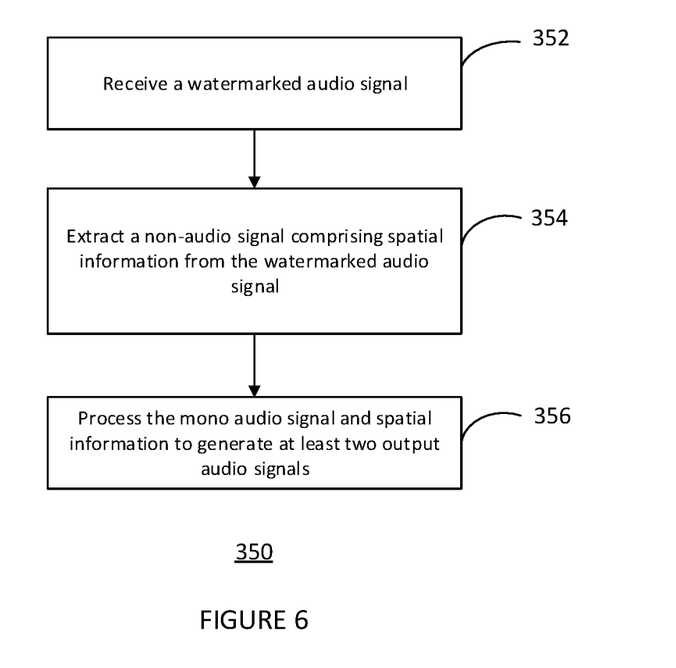
FIG. 6 shows a method of audio communication over a network according to an embodiment.

FIG. 6 illustrates a method of receiving an audio signal 350 over a communications network. In step 352 a watermarked audio signal may be received. In step 354 a non-audio signal comprising spatial information may be extracted from the watermarked audio signal. In step 356, the watermarked mono audio signal and spatial information may be processed to generate at least two output audio signals.

The transmitter method 300 and the receiver method 350 may allow audio communication over a network. The embedded spatial information to be transmitted may be robust to any processing artefacts associated with for example a speech codec which may for example be a GSM speech codec for a cellular mobile network. A receiver implementing the receiver method 350 may retrieve spatial information after decoding and use it to position the audio from different participants in a call. This spatial information may have been embedded into the audio signal using watermarking by an audio processor implementing the method 300. The audio positioning may be implemented for example using acoustic beamforming techniques. Because the watermarked information is non-audible, the watermarked audio signal may also be received by a typical communication receiver in which case the additional spatial information may be discarded, and only the mono audio signal information is processed.

The transmitter method 300 and the receiver method 350 may be implemented for example in logic hardware or software running on a host processor or an embedded digital signal processor.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

An apparatus and method for speech communication is described. An audio transmit processor captures at least two audio signals from an audio source, and processes the at least two audio signals to provide a mono audio signal and a non-audio signal comprising spatial information representative of the direction or spatial position of the audio source. The audio transmit processor combines the non-audio signal with the mono audio signal by watermarking; and transmits the watermarked audio signal. An audio receive processor receives a watermarked audio signal and extracts a non-audio signal comprising spatial information from the watermarked audio signal. The audio receive processor receiver processes the mono (watermarked) audio signal and spatial information to generate at least two output audio signals. In embodiments an audio processor may implement an audio transmit processor and an audio receive processor which may be included in a mobile phone or other voice communication system.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An audio transmit processor for a transmitter device configured for communication over a network, the audio transmit processor comprising:
   an audio capture module configured to
      receive at least two audio signals from an audio source,
      generate parametric stereo information from the at least two audio signals,
      generate spatial information from the at least two audio signals, and
      generate a mono audio signal and a non-audio signal from the at least two audio signals, the non-audio signal comprising geographic location coordinates of the transmitter device, the parametric stereo information, and spatial information of the audio source; and
   an audio watermarking module coupled to the audio capture module and configured to embed the non-audio signal in the mono audio signal as a watermark in the mono audio signal, wherein the embedded non-audio signal is encoded by Phase Shift Keying (PSK);
   a speech codec coupled to the audio watermarking module and configured to encode the mono audio signal embedded with the non-audio signal as the watermark; wherein the encoding comprises compressing the mono audio signal embedded with the non-audio signal as the watermark for transmission; wherein the watermark is recoverable from the compressed mono audio signal embedded with the non-audio signal.

2. The audio transmit processor of claim 1, wherein the spatial information is representative of one or more of a direction and a position of the audio source.

3. The audio transmit processor of claim 1, wherein the spatial information comprises at least one of a time-difference-of-arrival difference and an intensity difference between the at least two audio signals.

4. The audio transmit processor of claim 1, wherein the parametric stereo data comprises at least one of a phase difference between the at least two audio signals per frequency band, a level difference between the at least two audio signals per frequency band, and coherence between the at least two signals per frequency band.

5. The audio transmit processor of claim 1, wherein the geographic location coordinates are GPS coordinates.

6. The audio transmit processor of claim 1, wherein each of the at least two audio signals are received from a respective microphone.

7. The audio transmit processor of claim 1, wherein the audio watermarking module is configured to embed the non-audio signal in the mono audio signal and to output the watermarked mono audio signal by:
   filtering the mono audio signal by a filter-bank;
   applying sinusoidal amplitude modulations (SAM) to neighboring sub-band signals in an opposite phase;
   using the SAM as a carrier; and
   encoding the non-audio signal onto the carrier.

8. The audio transmit processor of claim 1, wherein the audio watermarking module is configured to extract the non-audio signal embedded in the received mono audio signal by:
   filtering the received mono audio signal by a filter-bank;
   extracting sinusoidal amplitude modulations (SAM) based on a ratio of amplitude envelopes from neighboring sub-band signals;
   comparing the SAMS of a base group to those of other groups; and
   decoding the non-audio signal based on the comparison.

9. The audio transmit processor of claim 1, wherein the non-audio signal further indicates a number of microphones to capture the at least two audio signals.

10. An audio receive processor for a receiver device configured for voice communication over a communications network, the audio receive processor comprising:
a speech codec module configured to decode a watermarked mono audio signal having a mono audio signal and a watermark of a non-audio signal embedded in the mono audio signal, wherein the watermarked mono audio signal was compressed by a transmitter speech codec for transmission over the communication network and the decoding comprises a decompression of the watermarked mono audio signal;
an audio watermark extraction module coupled to the speech codec module and configured to extract the non-audio signal embedded in the decoded watermarked mono audio signal, wherein the embedded non-audio signal is encoded by Phase Shift Keying (PSK), the non-audio signal comprising geographic location coordinates of a transmitter device which transmits the watermarked mono audio signal, parametric stereo information, and spatial information of an audio source; and
an audio playback module coupled to the audio watermark extraction module and configured to process the mono signal and the parametric stereo information and spatial information and to provide at least two output audio signals for output via a respective loudspeaker.

11. The audio receive processor of claim 10, wherein the spatial information is representative of a direction or a spatial position of audio of the audio source captured by a transmitter.

12. The audio receive processor of claim 10, wherein the audio playback module is further configured to apply upmixing to the mono audio signal in dependence of the spatial information.

13. The audio receive processor of claim 10, wherein the audio playback module is coupled to the audio watermark extraction module and configured to process the mono signal, the parametric stereo information, and spatial information using acoustic beamforming to position audio associated with the at least two output audio signals based on the spatial information.

14. An audio processor comprising the audio transmit processor of claim 1.

15. A method for transmitting audio over a communications network, the method comprising:
capturing at least two audio signals from an audio source;
processing the at least two audio signals to provide a mono audio signal and a non-audio signal comprising geographic location coordinates of a transmitter device which transmits the audio, parametric stereo information, and spatial information of the audio source, wherein the non-audio signal is encoded by Phase Shift Keying (PSK);
combining the non-audio signal with the mono audio signal by watermarking the mono audio signal with the non-audio signal; and
outputting the watermarked mono audio signal to a speech codec which encodes the watermarked mono audio signal; wherein the encoding comprises compressing the watermarked mono audio signal for transmission; wherein the watermarked non-audio signal is recoverable from the compressed watermarked mono audio signal.

16. The method of claim 15, wherein the spatial information is representative of one or more of a direction and a position of the audio source.

17. A method for receiving audio over a communications network comprising:
receiving a watermarked mono audio signal from an audio source, the watermarked mono audio signal having a non-audio signal as a watermark on a mono audio signal;
decoding, by a speech codec, the watermarked mono audio signal, wherein the watermarked mono audio signal was compressed by a transmitter speech codec for transmission over the communication network and the decoding comprises a decompression of the watermarked mono audio signal;
extracting from the decoded watermarked mono audio signal the mono audio signal and the non-audio signal comprising spatial information from the watermarked audio signal, the non-audio signal comprising geographic location coordinates of a transmitter device of the watermarked audio signal, parametric stereo information, and spatial information of the audio source, wherein the non-audio signal is encoded by Phase Shift Keying (PSK); and
processing the mono audio signal and spatial information to generate at least two output audio signals.

18. An audio processor comprising an audio transmit processor and the audio receive processor of claim 10.

* * * * *